(12) United States Patent
Ishida

(10) Patent No.: US 6,817,213 B2
(45) Date of Patent: Nov. 16, 2004

(54) METHOD OF FABRICATING OPTICAL FIBER PREFORM AND METHOD OF FABRICATING OPTICAL FIBER

(75) Inventor: Yoshinori Ishida, Tokyo (JP)

(73) Assignee: The Fukukawa Electric Co., Ltd., Tokyo (JP)

( * ) Notice: Subject to any disclaimer, the term of this patent is extended or adjusted under 35 U.S.C. 154(b) by 425 days.

(21) Appl. No.: 09/982,015

(22) Filed: Oct. 19, 2001

(65) Prior Publication Data

US 2002/0073741 A1 Jun. 20, 2002

(30) Foreign Application Priority Data

Dec. 14, 2000 (JP) .................................... 2000-380665

(51) Int. Cl.[7] .................................................... C03B 37/018
(52) U.S. Cl. ............................ 65/414; 65/415; 65/422; 65/435
(58) Field of Search ......................... 65/414, 415, 422, 65/435

(56) References Cited

U.S. PATENT DOCUMENTS

| | | | |
|---|---|---|---|
| 4,685,945 A | 8/1987 | Freund | |
| 4,737,179 A | 4/1988 | Tanaka et al. | |
| 5,238,479 A | 8/1993 | Ohga et al. | |
| 5,318,611 A | 6/1994 | Merritt | |
| 6,306,500 B1 | * 10/2001 | Kuwabara et al. | ............ 428/372 |
| 6,477,305 B1 | * 11/2002 | Berkey et al. | ............... 385/123 |

FOREIGN PATENT DOCUMENTS

EP          0 887 670         12/1998

OTHER PUBLICATIONS

T. Moriyama, et al., Electronics Letters, vol. 16, No. 18, XP–002081489, pp. 698–699, "Ultimately Low OH Content V.A.D. Optical Fibres", Aug. 28, 1960.

* cited by examiner

Primary Examiner—Peter Chin
(74) Attorney, Agent, or Firm—Oblon, Spivak, McClelland, Maier & Neustadt, P.C.

(57) ABSTRACT

Methods of fabricating an optical fiber preform and a method of fabricating an optical fiber of the invention realize the fabrication of an optical fiber having desirable transmission characteristics in the entire wavelength rage of about 1.3 to 1.6 $\mu$m. The fabrication method comprises a porous core rod producing step of depositing a first cladding (3) having an outer diameter D so as to surround a core (2) having an outer diameter d to produce a porous core rod (1) of $D/d \geq 4.0$ by VAD. Then, the porous core rod (1) is dehydrated to reduce the OH group concentration to 0.8 ppb or less by weight ratio. The porous core rod (1) is formed to be transparent for a vitrified core rod (4) and is heated and stretched. Thereafter, a second cladding is obtained by depositing a second porous cladding (5) around the vitrified core rod (4) by VAD to be dehydrated, transparent and vitrified. The optical fiber preform thus fabricated is drawn to form into an optical fiber and is then allowed to stand in a deuterium gas atmosphere for a predetermined period.

2 Claims, 4 Drawing Sheets

METHOD OF FABRICATING OPTICAL FIBER PREFORM AND METHOD OF FABRICATING OPTICAL FIBER

FIELD OF THE INVENTION

The present invention relates to a method of fabricating an optical fiber preform and a method of fabricating an optical fiber for use in fabricating an optical fiber for conducting the single mode transmission with low transmission losses in the wavelength range of about 1.3 to 1.6 µm.

BACKGROUND OF THE INVENTION

Recently, with a rapidly growing amount of communication information, the era of the wavelength division multiplexing (WDM) transmission is coming. The WDM transmission is a system for transmitting a plurality of light signals, in which the wavelength for the optical communication is divided into a plurality of wavelengths, not one wavelength. The WDM is an optical transmission system suitable for high capacity and high bit-rate communication.

The transmission networks of the optical communication are formed by using single mode optical fibers having a zero dispersion wavelength in a 1.31 µm waveband, laying all over the world, as the subscriber networks are centered.

However, orthodox single mode optical fibers have great transmission losses in a waveband of 1.36 to 1.43 µm due to the light absorption by hydroxyl groups (OH groups). In addition, the light absorption peak wavelength of the hydroxyl group exists in 1.24 µm and 1.38 µm. On this account, the wavelength for the above-mentioned WDM transmission conducted by using the single mode optical fiber has been limited to the wavebands of 1.31 and 1.55 µm.

Then, an optical fiber that reduces the absorption peak in the waveband of 1.36 to 1.43 µm to solve the problem of the single mode optical fiber has been proposed. Furthermore, the WDM transmission system that uses the proposed optical fiber and utilizes the entire wavelengths of about 1.3 to 1.6 µm has been proposed.

For example, Japanese Patent Application (Application No. 171575/1999) describes a method of fabricating an optical fiber preform to obtain an optical fiber where the absorption peak in the waveband of 1.36 to 1.43 µm is reduced. The points of the method of fabricating the optical fiber preform are as follows.

(1) First, a porous core rod is produced by vapor-phase axial deposition (VAD). Additionally, the porous core rod is produced by covering a core with a thin first cladding by VAD.

(2) Then, after the porous core rod is dehydrated and sintered, it is heated and stretched.

(3) Subsequently, OH groups on the surface of the porous core rod are removed by etching treatment.

(4) The porous core rod in which the OH group concentration has been thus reduced is inserted into a glass tube for a cladding cover with a reduced OH group concentration. The cover glass tube is crushed by heating to fabricate an optical fiber preform with a cladding having a sufficient thickness.

SUMMARY OF THE INVENTION

The invention is to provide a method of fabricating an optical fiber preform and a method of fabricating an optical fiber using the same method.

The method of fabricating an optical fiber preform of the invention comprises:

a porous core rod producing step for depositing a first cladding having an outer diameter D so as to surround a core having an outer diameter d to produce a porous core rod of $D/d \geq 4.0$, using vapor-phase axial deposition;

a core rod dehydrating step for dehydrating the porous core rod to reduce an OH group concentration in the porous core rod to 0.8 ppb or less by weight ratio after the porous core rod producing step;

a core rod vitrifying step for forming the porous core rod to be transparent and vitrified to form a vitrified core rod after the core rod dehydrating step;

a core rod stretching step for heating and stretching the vitrified core rod after the core rod vitrifying step;

a second cladding forming step for depositing a second porous cladding around the vitrified core rod by vapor-phase axial deposition after the core rod stretching step;

a second cladding dehydrating step for dehydrating the second porous cladding so as to reduce an OH group concentration to 50 ppm or less by weight ratio after the second cladding forming step; and a second cladding vitrifying step for forming the second porous cladding to be transparent and vitrified after the second cladding dehydrating step.

BRIEF DESCRIPTION OF THE DRAWINGS

Exemplary embodiments of the invention will now be described in conjunction with drawings, in which.

DETAILED DESCRIPTION

Figure 1:
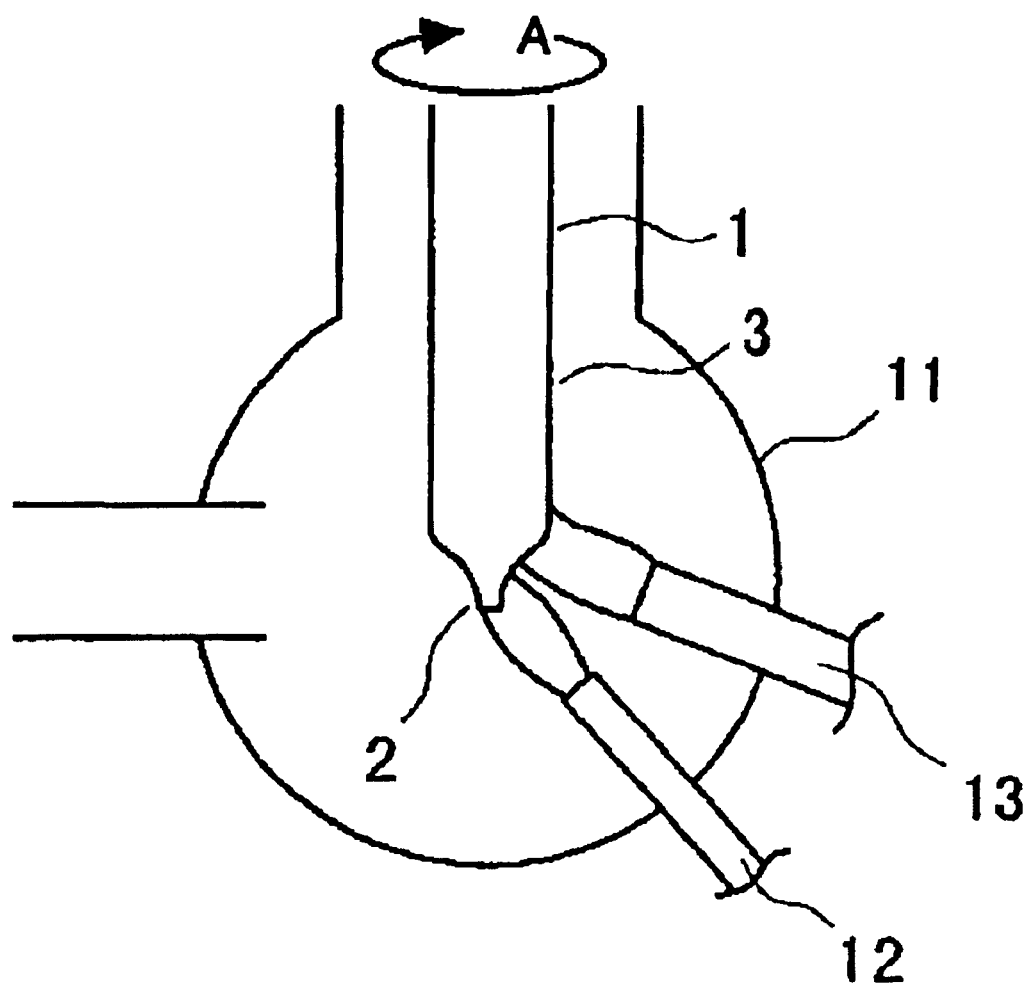
FIG. 1 depicts an illustration showing a porous core rod producing step in one embodiment of the method of fabricating the optical fiber preform in the invention.

The proposed example of the method of fabricating the optical fiber preform described above removes the OH groups on the surface of the above-mentioned porous core rod by etching the surface of the porous core rod. Therefore, the OH groups-removing process needs costs of equipment for a plasma etching apparatus, and processing costs are also increased in accordance with an increase in man-hours.

Additionally, in the optical fiber preform fabricated by applying the method of fabricating the optical fiber preform described above, a cladding having a sufficient thickness is formed by inserting the core rod into the cladding cover glass tube. Therefore, the OH group concentration of the cladding cover glass tube needs to be reduced, as the thickness of the first cladding is thinner. However, a cladding cover glass tube having a low OH group concentration is not fabricated easily.

Furthermore, in the optical fiber fabricated from the optical fiber preform obtained by applying the method of fabricating the optical fiber preform, a problem has arisen that transmission losses in the waveband of 1.36 to 1.43 µm are increased when the optical fiber is used under a high-energy radiation environment or $H_2$ ion atmosphere. It is considered that the transmission loss increase is caused by the defects of peroxide radicals that have been generated in the optical fiber preform fabrication.

One aspect of the methods of fabricating the optical fiber preform and the method of fabricating the optical fiber in the invention is the fabrication methods of the optical fiber preform and method of fabricating the optical fiber capable of obtaining the following optical fiber. The optical fiber obtained by applying the invention is an optical fiber that has a small absorption peak in the waveband of 1.36 to 1.43 μm and is suitable for conducting the WDM transmission utilizing the entire wavelengths of 1.25 to 1.60 μm. Additionally, the application of the method of fabricating the optical fiber preform of the invention allows the fabrication of a large-sized optical fiber preform capable of obtaining the above-mentioned optical fiber with excellent productivity and at low costs.

Furthermore, the optical fiber fabricated by applying the method of fabricating the optical fiber of the invention can prevent the transmission loss increase in the waveband of 1.36 to 1.43 μm, even though it is used under the high-energy radiation environment and the $H_2$ atmosphere.

Hereafter, one embodiments of the invention will be described in detail with reference to the drawings. The process of fabricating an optical fisber preform of the embodiment is as follows. That is, the method in fabricating the embodiment fabricates the optical fiber preform by conducting the following steps 1) to 7) sequentially.

The steps 1) to 7) are: 1) porous core rod producing step by VAD; 2) core rod dehydrating step; 3) core rod vitrifying step; 4) core rod stretching step; 5) second porous cladding forming step by VAD; 6) second cladding dehydrating step; and 7) second cladding vitrifying step.

Hereafter, a specific example of each of the steps will be described.

1) Porous Core Rod Producing Step by VAD

This step is a step of depositing a first cladding 3 having an outer diameter D so as to surround a core 2 having an outer diameter d to produce a porous core rod 1 to be D/d≧4.0 by VAD. The production of the porous core rod 1 is conducted inside a reaction vessel 11 as shown in FIG. 1. Inside the reaction vessel 11, a seed rod (not shown) that can be rotated, as indicated by an arrow A shown in FIG. 1 and drawn, is inserted. Fine glass particles for forming the porous core rod 1 are deposited and grown on the surface of the seed rod to produce the porous core rod 1.

The fine glass particles are formed by gases blown out of a core burner 12 and a first cladding burner 13. The core burner 12 is charged with fuel gases (oxygen and hydrogen, for example) and source gases ($SiCl_4$ and $GeCl_4$, for example) and the fuel gases generate oxyhydrogen flame. The oxyhydrogen flame causes flame hydrolysis reaction in the source gases gushed out of the core burner 12 to form the fine glass particles for the core 2.

Additionally, the first cladding burner 13 is charged with fuel gases (oxygen and hydrogen, for example) and a source gas ($SiCl_4$, for example) and the fuel gases generate oxyhydrogen flame. The oxyhydrogen flame causes flame hydrolysis reaction in the source gas gushed out of the first cladding burner 13 to form the fine glass particles for the first cladding 3.

Furthermore, as described above, the core 2 is doped with Ge, thereby making a refractive index of the core 2 higher than that of the first cladding 3.

Moreover, in one embodiment, the outer diameter d of the core 2 was set to 30 mm, the outer diameter D of the first cladding 3 was set to about 150 mm, and D/d was set to about 5 in the step described above.

2) Core Rod Dehydrating Step

This step is a step of dehydrating the porous core rod 1 to reduce the OH group concentration in the porous core rod 1 to 0.8 ppb or less by weight ratio. In addition, the inventor confirms that the light absorption in the waveband of 1.36 to 1.43 μm can be reduced nearly equal to the light absorption in the waveband of 1.31 μm when the OH group concentration in the porous core rod 1 is made 0.8 ppb or less by weight ratio.

The step of dehydrating the porous core rod 1 is conducted such that the porous core rod 1 is allowed to stand in a dehydrating of He mixed with chlorine or fluorine at a temperature of about 1200° C. Furthermore, the dehydration may be conducted such that it is allowed to stand in an atmosphere with oxygen added. The dehydrating step reduces OH groups and impurities inside the porous core rod 1 and allows the OH group concentration to be 0.8 ppb or less by weight ratio.

Moreover, the step of dehydrating the porous core rod 1 is conducted by a simple method in which the porous core rod 1 is only allowed to stand at high temperature. That is, it does not need costs of equipment for a plasma etching apparatus for etching the surface of the porous core rod to remove the OH groups, as the above-mentioned proposed example, and processing costs are inexpensive as well.

3) Core Rod Vitrifying Step

This step is a step of forming the porous core rod 1 to be transparent and vitrified. The porous core rod 1 is formed to be transparent and vitrified by sintering the dehydrated porous core rod 1 in an He atmosphere at temperature of 1400 to 1500° C. The is conducted in an atmosphere mixed with chlorine or fluorine as necessary. The porous core rod 1 is converted to a transparent vitrified core rod having an outer diameter of about 80 mm by the sintering. Additionally, the OH group concentration of the vitrified core rod is maintained at 0.8 ppb or less by weight ratio.

4) Core Rod Stretching Step

Figure 2:
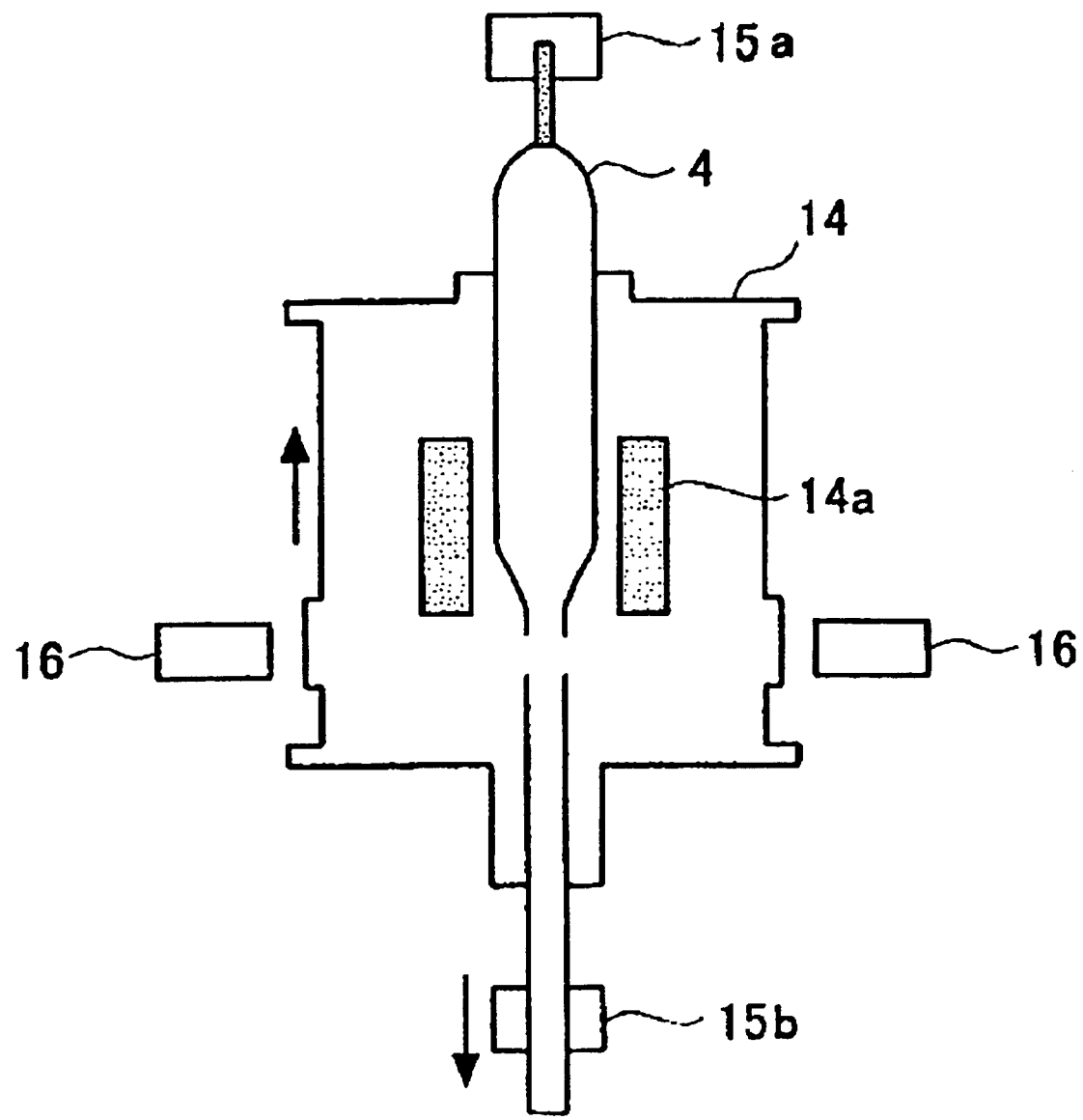
FIG. 2 depicts an illustration showing a stretching step in the above one embodiment.

This step is a step of heating and stretching the vitrified core rod. As shown in FIG. 2, the vitrified core rod 4 is stretched by using an electric furnace 14. The electric furnace 14 is filled with an inert atmosphere and temperatures thereof are set to about 1800 to 2000° C. In this state, both ends of the vitrified core rod 4 are gripped by chucks 15a and 15b. As the electric furnace 14 is elevated, the lower end chuck 15 is descended to increase the distance between the chucks 15a and 15b. Thereby, the vitrified core rod 4 is stretched and reduced in diameter.

By this stretching step the outer diameter of the vitrified core rod 4 is reduced from about 80 mm to 36 mm with the length of 2000 mm.

In FIG. 2, 14a denotes a heater and 16 denotes an outer diameter measuring device for measuring the outer diameter of the stretched core rod 4.

This step is conducted by using the electric furnace 14, for example. Since OH groups are not generated unlike the case of stretching by flame, the OH group concentration of the vitrified core rod 4 is not increased.

5) Second Porous Cladding Forming Step by VAD

Figure 3:
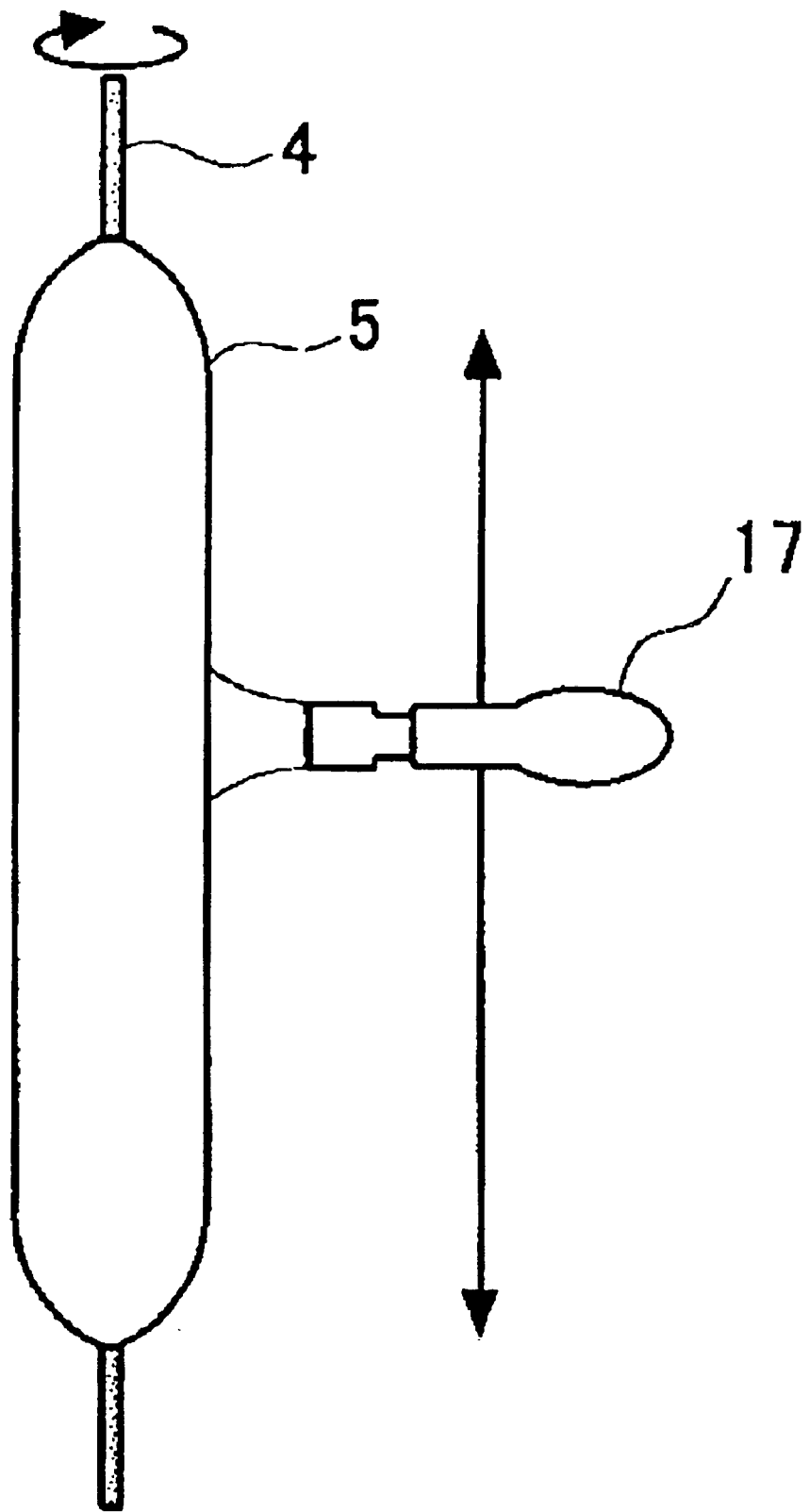
FIG. 3 depicts an illustration showing a second porous cladding forming step in the above one embodiment.

This step is a step of depositing a second porous cladding around the stretched, vitrified core rod 4 by VAD. As shown in FIG. 3, the stretched, vitrified core rod 4 is rotatably held vertically. Then, a second burner 17 blows fine glass particles to form a second porous cladding 5 having an outer diameter of 250 mm.

The second cladding burner 17 is charged with fuel gases (oxygen and hydrogen, for example) and a source gas (SiCl$_4$, for example) and the fuel gases generate oxyhydrogen flame. The oxyhydrogen flame causes flame hydrolysis reaction in the source gas gushed out of the second cladding burner 17 to form fine glass particles for a second porous cladding 5.

The second cladding burner 17 elevates vertically on a straight line parallel to the vitrified core rod 4 and attaches the fine glass particles uniformly over the entire length of the vitrified core rod 4.

A synthetic rate of the second porous cladding 5 was 20 g/min under the following conditions. The synthetic conditions for the second porous cladding 5 are that hydrogen is set 200 slm (standard litter per minutes), oxygen is set 100 slm and SiCl$_4$ is set 70 g/min in one burner 17 and the elevating speed of the burner 17 is set 500 mm/min.

As described above, this step can form the second porous cladding 5 extremely large at high speed.

In addition, the burner 17 used may be one burner, but a plurality of burners allows synthesis at higher speed. Furthermore, the density distribution of porous bodies in the radius direction in the second porous cladding 5 can be controlled arbitrarily by changing the flow rates of fuels and sources, the elevating speed of the burner, and the revolutions of the vitrified core rod 4. The density distribution of the porous bodies is preferably such a density distribution that is reduced as becoming more distant from the vitrified core rod 4. With such density distribution, the following second cladding dehydrating step can be conducted efficiently.

6) Second Cladding Dehydrating Step

This step is a step of dehydrating the above-mentioned second porous cladding 5 to reduce the OH group concentration in the second porous cladding 5 to not more than 50 ppm by weight ratio. The dehydrating step is conducted such that the second porous cladding 5 is heated and allowed to stand in an atmosphere of He mixed with chlorine at a temperature of about 1200° C., for example. The dehydrating step removes OH groups and impurities inside the second porous cladding 5 and reduces the OH group concentration to 50 ppm or less.

Additionally, in the previous step of forming the second porous cladding 5, when the density distribution of the porous bodies is obtained so as to efficiently conduct the dehydration, the OH group concentration can be reduced efficiently. That is, when the density distribution is so made that the density of the porous bodies in the second porous cladding 5 is reduced as becoming more distant from the vitrified core rod 4, the dehydration can be conducted efficiently. The inventor confirms this phenomenon by experiments.

7) Second Cladding Vitrifying Step

This step is a step of sintering the dehydrated second porous cladding 5 in an atmosphere of He mixed with chlorine or fluorine at temperatures of 1400 to 1500° C. to form the second cladding to be transparent and vitrified. After the step is complete, a transparent optical fiber preform having an outer diameter of about 100 mm is formed.

Additionally, the weight of the second cladding becomes about 12 times that of the vitrified core rod 4. To make the OH groups of the cladding to be nearly equal to that of the core, the density of the cladding may be reduced. However, when the density of the second porous cladding 5 is made to be nearly the same as that of the porous core rod 1, the outer diameter of the second porous cladding 5 becomes extremely large, which is not practical for facilities.

The density of the second porous cladding 5 needs to be set greater than that of the porous core rod 1. The removal efficiency of the OH groups is declined in the dehydrating step. Accordingly, the OH group concentration of the second porous cladding 5 becomes higher than that of the vitrified core rod 4. However, when the OH group concentration of the second porous cladding 5 is made 50 ppm or less, transmission losses to be practical problems in the waveband of 1.36 to 1.43 μm were not generated at D/d of 4.0 or more.

Furthermore, the method of fabricating the optical fiber preform of the above one embodiment is that the inventor was dedicated to experimentally studying, setting and carrying out the method of fabricating a large-sized optical fiber preform suitable for performing the WDM transmission utilizing the entire wavelengths of 1.25 to 1.60 μm.

In other words, the method of fabricating the optical fiber preform of one embodiment has preferable conditions for fabricating the optical fiber preform capable of fabricating the preform for the optical fiber mentioned above with excellent productivity and only by VAD.

For example, in the step of producing the porous core rod 1, D/d, which is the relationship between the outer diameter d of the core 2 and the outer diameter D of the first cladding 3, is to be an index indicating the extent that OH groups diffuse from the second cladding to the core. Since the OH groups hardly diffuse to the core when D/d is great, greater D/d is desirable in this point. On the other hand, when D/d is made greater while D is limited for facilities because of equipment configuration for producing the porous core rod 1, the core diameter d becomes relatively smaller. On this account, D/d is desirably smaller.

Then, in order to realize drawing a long optical fiber, the inventor experimentally determined the OH group concentrations for D/d and the second cladding, which allow the core diameter d to be greater as much as possible and reduce the OH group concentration of the core 2 to 0.8 ppb or less by weight ratio.

Consequently, it was found that D/d is set 4 or more in order to maintain the OH group concentration of the core to be 0.8 ppb or less when the OH group concentration of the second cladding is set 50 ppm by weight ratio. In other words, it was found that the core diameter d can be made greater up to D/4 and thus D/d≧4.0 was set in the step of producing the porous core rod 1 as described above.

Additionally, the inventor also experimentally determined, properly set and implemented the other conditions.

Next, one embodiment of the method of fabricating the optical fiber in the invention will be described. For example, an optical fiber can be obtained by heating the tip end part of the optical fiber preform, which has been obtained in the fabrication process of the optical fiber preform described above, at as temperature of about 2000° C. for drawing. The outer diameter of the optical fiber is formed to be 125 μm. Typical resin coating is applied to the optical fiber and thereby a practical mechanical strength can be obtained by protecting the optical fiber surface.

Figure 4:
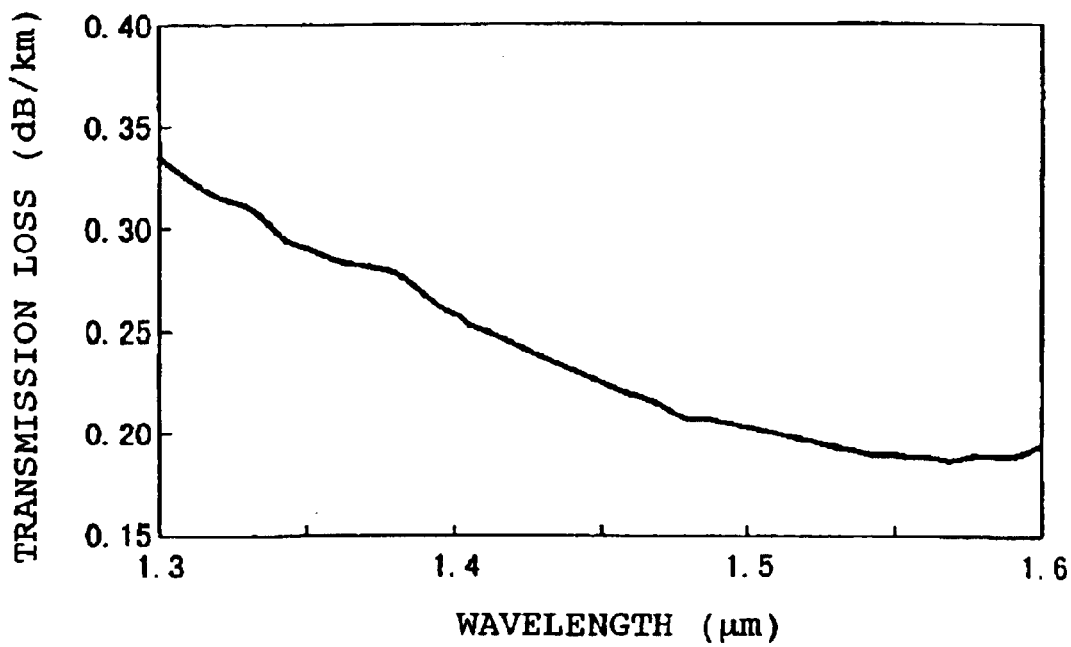
FIG. 4 depicts a diagram illustrating the transmission loss spectra of the optical fiber obtained from the optical fiber preform fabricated in the above one embodiment.

FIG. 4 depicts transmission losses of the optical fiber fabricated as described above. This optical fiber did not generate the transmission loss peak in the waveband of 1.36 to 1.43 μm.

Furthermore, in one embodiment of the method of fabricating the optical fiber, the above-mentioned optical fiber is allowed to stand at normal temperatures under a atmospheric environment containing about 10% of D$_2$ (deuterium gas) for one hour. Then, the method of fabricating the optical fiber of the embodiment is characterized in that the transmission loss peak in the waveband of 1.36 to 1.43 μmm can be suppressed by applying the D$_2$ treatment even though the optical fiber having been applied to the $D_2$ treatment is exposed in a hydrogen atmosphere.

Figure 5:
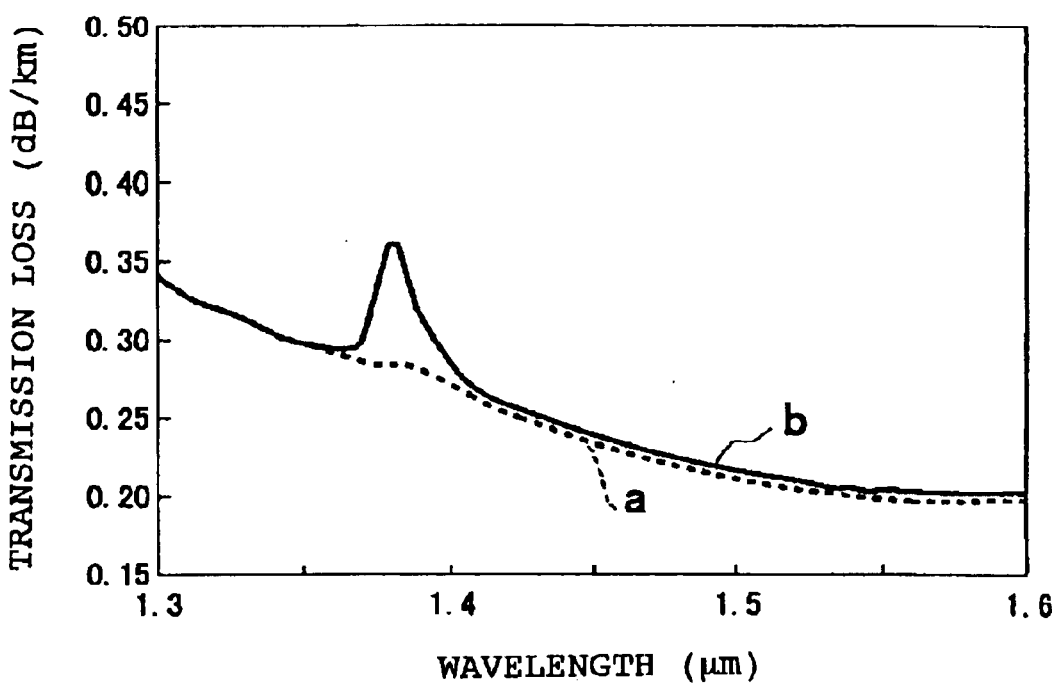
FIG. 5 depicts a diagram illustrating the transmission loss spectra of the optical fiber obtained from the optical fiber preform fabricated in the above one embodiment, after the optical fiber is allowed to stand in a hydrogen atmosphere.

A characteristic line a shown in FIG. 5 is a result showing that the $D_2$ treated optical fiber was allowed to stand in a nitrogen atmosphere containing hydrogen of about 1% at room temperature for four days and then transmission loss spectra were measured. As apparent from the characteristic line a shown in FIG. 5, the $D_2$ treated optical fiber did not generate the transmission loss peak in the waveband of 1.36 to 1.43 $\mu$m. On the other hand, a characteristic line b shown in FIG. 5 is a result showing that the $D_2$ untreated optical fiber was allowed to stand in a hydrogen atmosphere for four days under the same conditions. As indicated by the characteristic line b shown in FIG. 5, the increase in the transmission losses were noticed in the waveband of 1.36 to 1.43 $\mu$m in the $D_2$-untreated optical fiber.

In addition, the inventor performed the $D_2$ treatment based on the following new evidences. That is, in the optical fiber obtained by applying the method of fabricating the optical fiber preform of one embodiment, the defects of peroxide radicals generated in fabrication, for example, are substituted by OD groups. Then, the optical fiber having been $D_2$ treated can prevent an increase in OH groups of the optical fiber even though it is used under the high-energy radiation environment or $H_2$ atmosphere.

Furthermore, the light absorption peak of the OD groups described above exist at 1.26 $\mu$m and 1.66 $\mu$m, which is not in the waveband to be used in the optical communication (1.3 to 1.6 $\mu$m, for example). On this account, the transmission losses in the waveband of 1.36 to 1.43 $\mu$m are not increased in the $D_2$ treated optical fiber. Moreover, the concentration, temperature, pressure, and period of time of $D_2$ in the $D_2$ treatment are not limited to the conditions described above.

However, in the above-mentioned optical fiber usable in a wide wavelength range, the zero dispersion wavelength is preferably positioned almost in the middle of the wavelength range to be used (about 1.3 to 1.6 $\mu$m), nearly at 1.4 to 1.5 $\mu$m, for example. Then, the inventor set the zero dispersion wavelength of the optical fiber fabricated by the method of fabricating the optical fiber of one embodiment as described above. Consequently, the optical fiber obtained by the fabrication method described above could obtain excellent transmission characteristics in a wavelength range of 1280 to 1600 nm.

What is claimed is:

1. A method of fabricating an optical fiber comprising:

depositing a first cladding having an outer diameter D so as to surround a core having an outer diameter d to make a porous core rod of $D/d \geq 4.0$, by using a vapor-phase axial deposition method;

dehydrating the porous core rod to reduce an OH group concentration in the porous core rod to 0.8 ppb or less by weight;

vitrifying the porous core rod after the dehydrating the porous core rod step to make a core rod;

stretching the core rod;

depositing a second porous cladding around the core rod after the stretching step by using a vapor-phase deposition method;

dehydrating the second porous cladding to reduce an OH group concentration to 50 ppm or less by weight;

vitrifying the second porous cladding after the dehydrating the second porous cladding step to make an optical fiber preform; and drawing the optical fiber preform to make an optical fiber, wherein the optical fiber formed via said drawing step has a transmission loss at a wavelength of 1.38 $\mu$m less than a transmission loss at a wavelength of 1.31 $\mu$m both before and after exposure to a 1% H2 atmosphere at room temperature for 4 days.

2. The method according to claim 1, further comprising:

exposing the optical fiber after the drawing step to a deuterium containing atmosphere at room temperature for a predetermined period.

* * * * *